(No Model.)
E. F. LUTHY.
FEED WATER HEATER.
No. 390,608. Patented Oct. 2, 1888.
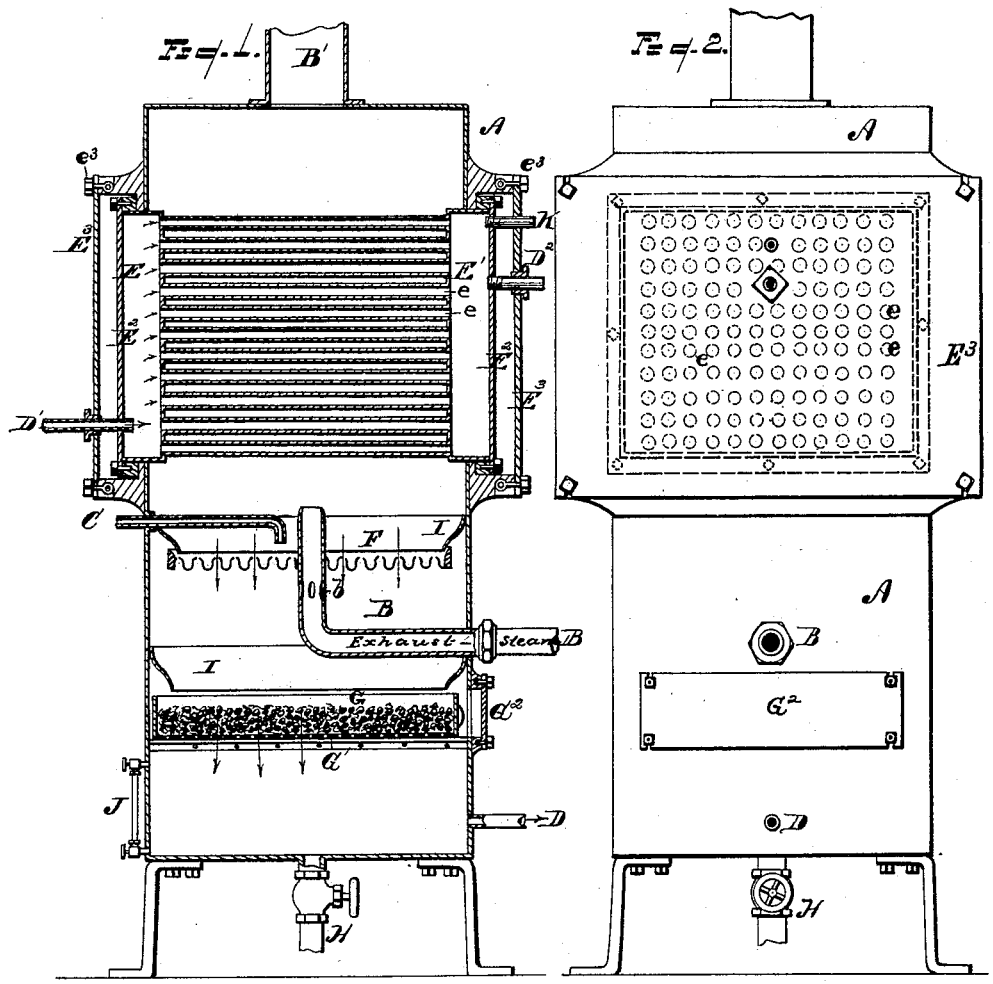
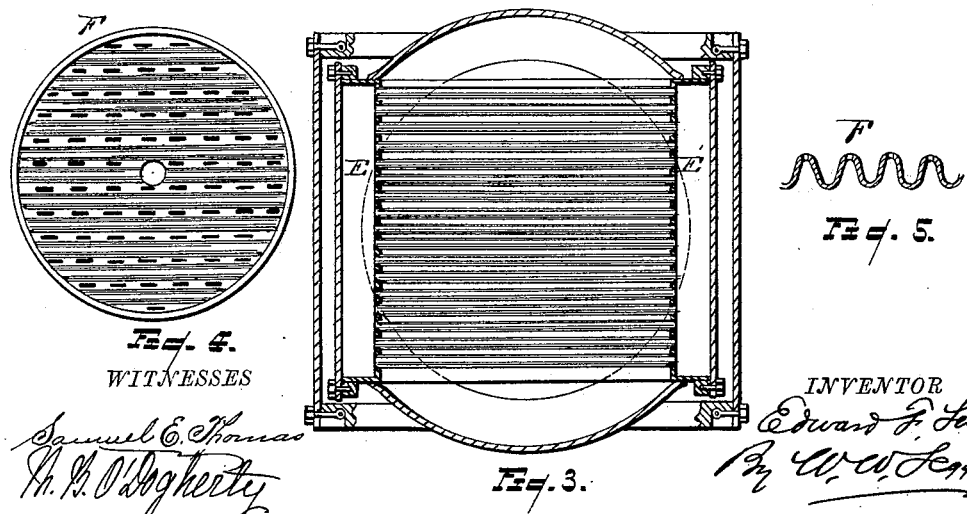
WITNESSES
INVENTOR
Edward F. Luthy
Attorney

UNITED STATES PATENT OFFICE.

EDWARD F. LUTHY, OF VERNON, MICHIGAN, ASSIGNOR OF ONE-FOURTH TO FREDERICK J. ROWLEY, OF SAME PLACE.

FEED-WATER HEATER.

SPECIFICATION forming part of Letters Patent No. 390,608, dated October 2, 1888.

Application filed May 10, 1888. Serial No. 273,486. (No model.)

*To all whom it may concern:*

Be it known that I, EDWARD F. LUTHY, a citizen of the United States, residing at Vernon, county of Shiawassee, State of Michigan, have invented a certain new and useful Improvement in Feed-Water Heaters; and I declare the following to be a full, clear, and exact description of the invention, such as will enable others skilled in the art to which it appertains to make and use the same, reference being had to the accompanying drawings, which form a part of this specification.

In the drawings, Figure 1 is a sectional view of an apparatus embodying my invention. Fig. 2 is an elevation of the same. Fig. 3 represents a horizontal section. Fig. 4 is a separate view of the distributing-plate. Fig. 5 is a sectional view of said plate.

My invention relates to that class of feed-water heaters in which exhaust-steam is utilized to raise the temperature of the feed-water; and the invention consists in the construction and combination of parts, as hereinafter described and claimed.

A represents a shell, preferably cylindrical. B is the exhaust-steam pipe; C, the water-admission pipe.

D is the water-exit pipe at the base of the heater, and it is upon the line of this pipe that the steam pump or injector used for forcing the water into the boiler is located.

$D'$ is the continuation beyond the pump or injector.

$D^2$ is a conduit leading off to the boiler.

E and $E'$ are heads or manifolds, which are provided with water-tubes $e$.

F is a distributing-pan.

The exhaust-steam pipe B has orifices $b$ beneath this distributing-pan, so that the exhaust steam may be discharged beneath the pan as well as above it, and so serve to heat the water to a considerable extent as it strains down through the said pan. This distributing-pan is preferably made of corrugated iron, as shown in Figs. 1, 4, and 5, with slots or perforations at the tops of the ridges. This enables the pan to gather any dirt or sediment in its channels without stopping up the perforations.

G is a filtering-pan provided with charcoal, coke, or other similar material, and $G'$ is a perforated bottom through which the fresh and condensed water may pass to the base of the heater.

H is a mud valve or blow-off cock, whereby impurities may be drawn off from the bottom of the heater.

I represents shields or deflectors for drawing the water and steam into the pans F and G.

B is the continuation of the exhaust-pipe beyond the heater.

$E^2$ represents removable caps or plates on the heads E $E'$ for gaining access to the interior of the water-tubes $e$, whereby they may be cleansed with a flue-scraper or a steam-blast.

$E^3$ represents removable plates upon the shell A to facilitate access to the water-tubes $e$.

The plates $E^2$ are bolted down securely, so as to withstand boiler-pressure; but the outer plates, $E^3$, are simply fastened securely enough to avoid an escape of the exhaust-steam. I prefer to provide them simply with eyebolts $e^3$. These bolts are so arranged that by simply loosening the nuts the bolts may be turned up around their pivots, thereby releasing the plate, enabling it to be lifted from the lower bolts.

$G^2$ is a door or plate, by removing which access can be had to the pan G.

The operation of this device is as follows: Water entering through the pipe C falls upon the pan F with water of condensation. Exhaust-steam entering through B passes out through its extremity and through the orifices $b$, thus bringing the water that enters into thorough contact with the hot exhaust-steam. As the water strains down through the pan F, it passes thence through the filtering material in the pan G, thence by the pump is drawn through the pipe D and forced through the pipe $D'$ into the head E, thence through the tubes $e$, where it is subjected to the direct action of the exhaust-steam. Passing thence into the head $E'$, it is conveyed to the boiler through the outlet $D^2$. By removing the plate $G^2$ the filtering-pan G may be drawn out and another one may be inserted in its place, or it may be recharged with coke, charcoal, or other filtering material and replaced within the heater. So, also, by removing the plates $E^3$ and $E^2$ the tubes $e$ can be cleaned with a flue-scraper. Again, if desired, the entire section of tubes may be lifted out from the shell of the heater and their exterior surfaces thoroughly cleaned of any scale or sediment. When thus removed, access may also be readily had to the pan F to cleanse it of impurities.

J is a water-gage to indicate the height of water in the bottom of the heater, and a communication, K, may be provided for drawing off scum that might form within the water-tubes.

This heater, it is apparent, presents many features of great convenience, all of which tend to increase its effectiveness and add to its lasting qualities. Its parts are all accessible for cleansing, and especially those parts, including the water-heater, where an accumulation of scale or sediment might thicken the walls and prevent the exhaust-steam from imparting the full benefit of its heat to the water that is being fed to the boiler.

What I claim is—

1. In a feed-water heater, the combination, with a shell, A, of a water-inlet conduit, C, a perforated pan, F, into which said conduit discharges, a filter, G, below said pan, a series of transverse tubes, $e$, through which the water, having passed the filter, circulates, an exhaust-steam pipe, B, passing up through and having orifices below the perforated pan, and a conduit, $D^2$, leading from the series of transverse tubes to the boiler, substantially as described.

2. A feed-water heater comprising a shell, A, a water-inlet, C, a perforated pan, F, into which said inlet discharges, a filter, G, below said pan, an exhaust-steam pipe, B, manifolds or heads E E', transverse tubes $e$, uniting said manifolds or heads, said manifolds or heads and tubes constituting a part of the feed-water conduit, and a connection from the tubes to the boiler, substantially as described.

3. A feed-water heater comprising a shell, A, a water-inlet, C, a perforated pan, F, into which said inlet discharges, a filter, G, below said pan, an exhaust-steam pipe, B, manifolds or heads E E', transverse tubes $e$, uniting said manifolds or heads and forming part of the feed-water conduit, removable plates for gaining access to the interior of said manifolds or heads and tubes, and a connection between the same and the boiler, substantially as described.

4. In a feed-water heater, the combination of a shell, A, a water-inlet, C, a corrugated pan, F, having slots or perforations at the top of the ridges, a filter, G, an exhaust-steam inlet-pipe, B, rising through and having orifices immediately below said perforated pan, and transverse tubes $e$, forming part of the feed-water conduit, substantially as and for the purpose described.

In testimony whereof I sign this specification in the presence of two witnesses.

EDWARD F. LUTHY.

Witnesses:
R. HOLMDEN,
A. F. WESTCOTT.